US012802550B2

(12) United States Patent
Legare et al.

(10) Patent No.: US 12,802,550 B2
(45) Date of Patent: Nov. 17, 2026

(54) SYSTEMS AND METHODS FOR ANOMALY DETECTION OF PHYSICAL ASSETS

(71) Applicant: BCE INC., Verdun (CA)

(72) Inventors: Francois Legare, Montreal (CA); Francis Vanier, Montreal (CA); Jafar Abbas, Montreal (CA); Nordés Ménard-Lamarre, Montreal (CA)

(73) Assignee: BCE INC., Verdun (CA)

( * ) Notice: Subject to any disclaimer, the term of this patent is extended or adjusted under 35 U.S.C. 154(b) by 0 days.

(21) Appl. No.: 18/736,896

(22) Filed: Jun. 7, 2024

(65) Prior Publication Data

US 2024/0412617 A1 Dec. 12, 2024

Related U.S. Application Data

(60) Provisional application No. 63/472,067, filed on Jun. 9, 2023.

(51) Int. Cl.
*G08B 21/18* (2006.01)
*G06T 7/00* (2017.01)
*G06T 7/11* (2017.01)

(52) U.S. Cl.
CPC .......... *G08B 21/182* (2013.01); *G06T 7/0004* (2013.01); *G06T 7/11* (2017.01);
(Continued)

(58) Field of Classification Search
CPC .......... G06N 20/00; G06N 5/04; G06N 3/045; G06N 3/0464; G06N 3/09; G06N 20/20; G06N 3/0475; G06N 3/08; G06N 3/094; G06N 5/045; G06N 3/04; G06N 3/047; G06N 3/088; G06N 3/091; G06N 3/00; G06N 7/00; G06F 18/214; G06F 18/217; G06F 9/46; G06F 9/5038; G06F 9/54; G06F 11/0751; G06F 11/0766; G06F 11/3457; G06F 11/3684; G06F 11/3692; G06F 17/18; G06F 30/23; G06F 16/4393; G06F 30/20; G06Q 10/103; G06V 20/44; G06V 20/46; G06V 20/52; G06V 30/19147;
(Continued)

(56) References Cited

U.S. PATENT DOCUMENTS 5,889,550 A * 3/1999 Reynolds .................. G01S 5/16
348/E5.022
9,989,645 B2 * 6/2018 Donnelly ................. B60N 2/02
(Continued)

*Primary Examiner* — Daniel Previl

(57) ABSTRACT

In accordance with the present disclosure, anomaly detection systems and methods are disclosed for automatically detecting physical anomalies using image data. The anomaly detection systems and methods disclosed herein can be used to detect anomalies in physical assets, such as anomalies present within a building, at a site, and/or anomalies associated with a piece of equipment. Image data is received from one or more cameras that are configured to capture image data of a physical asset. A probability of a physical anomaly being present in the image data is determined using an artificial intelligence model. The image data may be further analyzed to determine that the physical anomaly is a specific type of anomaly. An alert is output when the probability of the physical anomaly being present in the image data exceeds a threshold. A method of training an anomaly detection model is also disclosed.

17 Claims, 14 Drawing Sheets

(52) U.S. Cl.
CPC ............... *G06T 2207/20084* (2013.01); *G06T 2207/30164* (2013.01)

(58) Field of Classification Search
CPC ............ G06V 30/1916; G06V 30/1983; G06T 2207/20081; G06T 15/08; G06T 17/205; G06T 2210/41; G06T 7/0012; G06T 7/10; G06T 19/00; G06T 2207/20084; G06T 2207/30164; G06T 7/0004; G06T 7/11; G06T 1/00; G06T 3/00; G06T 5/00; G06T 7/00; G16H 30/40; G16H 50/20; G16H 50/50; G16H 10/60; G16H 20/30; G16H 20/40; G16H 40/63; G16H 50/30; A61B 2505/09; A61B 2562/0219; A61B 5/112; A61B 5/6801; A61B 5/7267; A61B 5/7282; A63B 24/0075; G05D 1/622; G05D 1/646; G05D 1/648; G05D 1/65; G05D 2101/15; G05D 2105/55; G05D 2105/70; G05D 2105/85; G05D 2109/10; G05D 2111/10; G05D 2111/20; G05D 2111/32; G05D 2111/52; G08B 21/182; G08B 1/00; G08B 3/00; G08B 27/00; G08B 29/00; G08B 31/00
USPC ......... 340/540, 541, 546, 545.3, 545.4, 551, 340/561, 568.1, 572.1, 602, 679–680, 340/686.1, 687, 691.2, 691.6, 693.8, 3.1
See application file for complete search history.

(56) References Cited

U.S. PATENT DOCUMENTS

| | | | | |
|---|---|---|---|---|
| 2019/0016264 | A1* | 1/2019 | Potnis | B60R 1/003 |
| 2021/0334645 | A1* | 10/2021 | Pardeshi | G10L 15/22 |
| 2021/0365358 | A1* | 11/2021 | Ide | G06N 5/045 |
| 2023/0267822 | A1* | 8/2023 | Ogawa | G08B 13/19613 455/404.1 |
| 2024/0017743 | A1* | 1/2024 | Farid | B60W 60/00274 |
| 2024/0130621 | A1* | 4/2024 | Islam | A61B 5/0075 |
| 2024/0212845 | A1* | 6/2024 | Khare | A61B 5/7282 |
| 2024/0249118 | A1* | 7/2024 | Benkert | G06N 3/08 |

* cited by examiner

416

414

418

420

421

422

423

426

427

424

SYSTEMS AND METHODS FOR ANOMALY DETECTION OF PHYSICAL ASSETS

CROSS-REFERENCE TO RELATED APPLICATIONS

This application claims priority to U.S. Provisional Patent Application 63/472,067, filed on Jun. 9, 2023, the entire contents of which is incorporated herein by reference for all purposes.

TECHNICAL FIELD

The present disclosure relates to anomaly detection using artificial intelligence, and in particular to detecting physical anomalies in image data.

BACKGROUND

Physical assets, such as buildings, equipment, etc., require monitoring for security, safety, operational efficiencies, etc. Typically, such physical assets are monitored by sensors and/or by visual inspection, which have several limitations and drawbacks.

For example, businesses often have several real estate assets that contain electrical/mechanical equipment, such as generator rooms, battery rooms, HVAC rooms, machine rooms, etc. One example of a major concern relating to these rooms is the possibility of a leak occurring, leading to contamination. To monitor for leaks, many rooms are equipped with physical sensors that are configured to send alerts to an operator. However, the sensors rely upon a lot of manual configuration, are limited in terms of tracked surface area, and may not always trigger. The use of cameras has been considered to detect leaks, but these likewise require manual configuration of alerts. Accordingly, businesses will send technicians periodically to these rooms to look for leaks and other issues, which is both time consuming and inefficient, particularly since a leak may have occurred well before the technician checks on the room and can result in significant damage.

Current techniques for monitoring physical assets therefore rely on manual and time-consuming efforts. Accordingly, systems and methods that enable anomaly detection of physical assets remain highly desirable.

SUMMARY

In accordance with one aspect of the present disclosure, an anomaly detection method is disclosed, comprising: receiving image data from one or more cameras configured to capture an image of a physical asset; determining a probability of a physical anomaly being present in the image data using an artificial intelligence model that is trained to detect anomalous image data; and outputting an alert when the probability of the physical anomaly being present in the image data exceeds a threshold value.

In some aspects, the method further comprises: analyzing the image data to determine that the physical anomaly is a specific type of anomaly; and outputting the alert including information on the specific type of anomaly present in the image data.

In some aspects, analyzing the image data to determine that the physical anomaly is the specific type of anomaly comprises determining a probability that the physical anomaly is the specific type of anomaly using one or more secondary artificial intelligence models that are trained to predict the physical anomaly as being one or more types of anomalies.

In some aspects, the one or more secondary artificial intelligence models comprise a model that is trained to perform image segmentation on the image data to classify the anomaly as being the specific type of anomaly.

In some aspects, the one or more secondary artificial intelligence models comprise a multi-modal generative AI model.

In some aspects, the method further comprises receiving a context of the image data, wherein the multi-modal generative AI model uses the context of the image data to determine the probability that the physical anomaly is the specific type of anomaly.

In some aspects, the method further comprises receiving audio data and/or vibration data associated with the physical asset, wherein the multi-modal generative AI model uses the received audio and/or vibration data to determine the probability that the physical anomaly is the specific type of anomaly.

In some aspects, the multi-modal generative AI model is configured to generate an output comprising one or both of: a description of the specific type of anomaly, and a suggested action for responding to the specific type of anomaly.

In some aspects, determining that the physical anomaly is the specific type of anomaly comprises applying one or more rules to the image data.

In some aspects, the method further comprises receiving auxiliary data associated with the physical asset from one or more sensors, and wherein determining that the physical anomaly is the specific type of anomaly is further based on the auxiliary data.

In some aspects, analyzing the image data to determine that the physical anomaly is the specific type of anomaly is performed automatically when the probability that the physical anomaly is present in the image data exceeds the threshold value.

In some aspects, analyzing the image data to determine that the physical anomaly is a specific type of anomaly is performed in response to a prompt to identify the specific type of anomaly.

In some aspects, the specific type of anomaly is one of: equipment overheat, presence of a human, presence of an animal, misplaced tools or equipment, fire, flood, falling material, and leaks.

In some aspects, the method further comprises receiving user feedback on the specific type of anomaly, and updating the one or more secondary artificial intelligence models based on the user feedback.

In some aspects, the method further comprises, in response to outputting the alert, receiving user feedback that the image data is normal, and updating the artificial intelligence model based on the user feedback.

In some aspects, the one or more cameras are configured to capture an image of an area of a building, an area of a site, or a piece of equipment.

In some aspects, the building comprises one of: a warehouse, a hospital, a mechanical room, a server room, and an electrical room.

In some aspects, the site comprises one of: an underground cable tunnel, a manufacturing site, an industrial site, and a mining site.

In some aspects, the piece of equipment is one of: a generator, a battery, a machine, a utility cabinet, and a heating, ventilation, and air conditioning (HVAC) unit.

In some aspects, the image data is received as a single image or a stream of images.

In some aspects, the image data is received in association with metadata comprising one or more of a camera identifier and a camera location.

In some aspects, the one or more cameras comprise one or more of: thermal cameras, near-infrared cameras, and RGB cameras.

In some aspects, the physical anomaly is detected as a thermal anomaly in the image data or a visual anomaly in the image data.

In accordance with another aspect of the present disclosure, an anomaly detection system is disclosed, comprising: a processor; and a non-transitory computer-readable memory having stored thereon computer-executable instructions which, when executed by the processor, configure the anomaly detection system to perform the anomaly detection method of any one of the above aspects.

In accordance with another aspect of the present disclosure, a method of training an anomaly detection model is disclosed, comprising: obtaining training images comprising normal image data; and training an artificial intelligence model to determine a probability of a physical anomaly being present in the image data.

In some aspects, the method further comprises: obtaining training images comprising anomalous image data that have a known anomaly; and training one or more secondary artificial intelligence models to determine the known anomaly present in the anomalous image data.

In some aspects, the one or more second artificial intelligence models comprise a multi-modal generative AI model, and the method further comprises: obtaining additional training data comprising an additional input type; and training the multi-modal generative AI model to determine the known anomaly present in the anomalous image data based on the training images comprising anomalous image data and the additional training data.

In some aspects, the method further comprises training the multi-modal generative AI model to generate outputs associated with the known anomaly in response to different input prompts.

In some aspects, the training images are obtained from one or more cameras.

In some aspects, the one or more cameras comprise one or more of: thermal cameras, near-infrared cameras, and RGB cameras.

In some aspects, the training images are obtained from a plurality of cameras, and wherein the artificial intelligence model is trained on the training images from each of the plurality of cameras.

In some aspects, the method further comprises generating the training images by recording images for a pre-set period of time under normal operating conditions.

In accordance with another aspect of the present disclosure, an anomaly detection model is disclosed that is trained in accordance with the method of training an anomaly detection model of any one of the above aspects.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

In accordance with the present disclosure, anomaly detection systems and methods are disclosed for automatically detecting physical anomalies using image data. The anomaly detection systems and methods disclosed herein can be used to detect anomalies in physical assets, such as anomalies present within a building, at a site (e.g. a manufacturing/industrial/mining site), and/or anomalies associated with a piece of equipment. Image data is received from one or more cameras that are configured to capture image data of a physical asset. The cameras may be thermal cameras, near-infrared cameras, or RGB cameras. The image data is analyzed to determine a probability of an anomaly being present in the image using an artificial intelligence model that is trained to detect anomalous image data. The image data may be further analyzed to determine that the physical anomaly is a specific type of anomaly, which may be performed using one or more secondary artificial intelligence models to analyze the image data and/or a deterministic algorithm that applies one or more rules to the image data. An alert is output when the probability of the physical anomaly being present in the image exceeds a threshold. A method of training an anomaly detection model is also disclosed.

Advantageously, systems and methods in accordance with the present disclosure allow for near-real time detection of anomalies, can identify small anomalies within a wide imaging area, can detect various types of anomalies using the same system, and requires no physical installation apart from one or more cameras. In some aspects, a multi-modal generative AI model may be used to make predictions on specific types of anomalies based on multiple types of inputs, and can generate various outputs such as a description of the anomaly, a suggested action for responding to the anomaly, etc., in addition to outputting an alert when the anomalous image data is detected.

Embodiments are described below, by way of example only, with reference to FIGS. 1-8.

Figure 1:
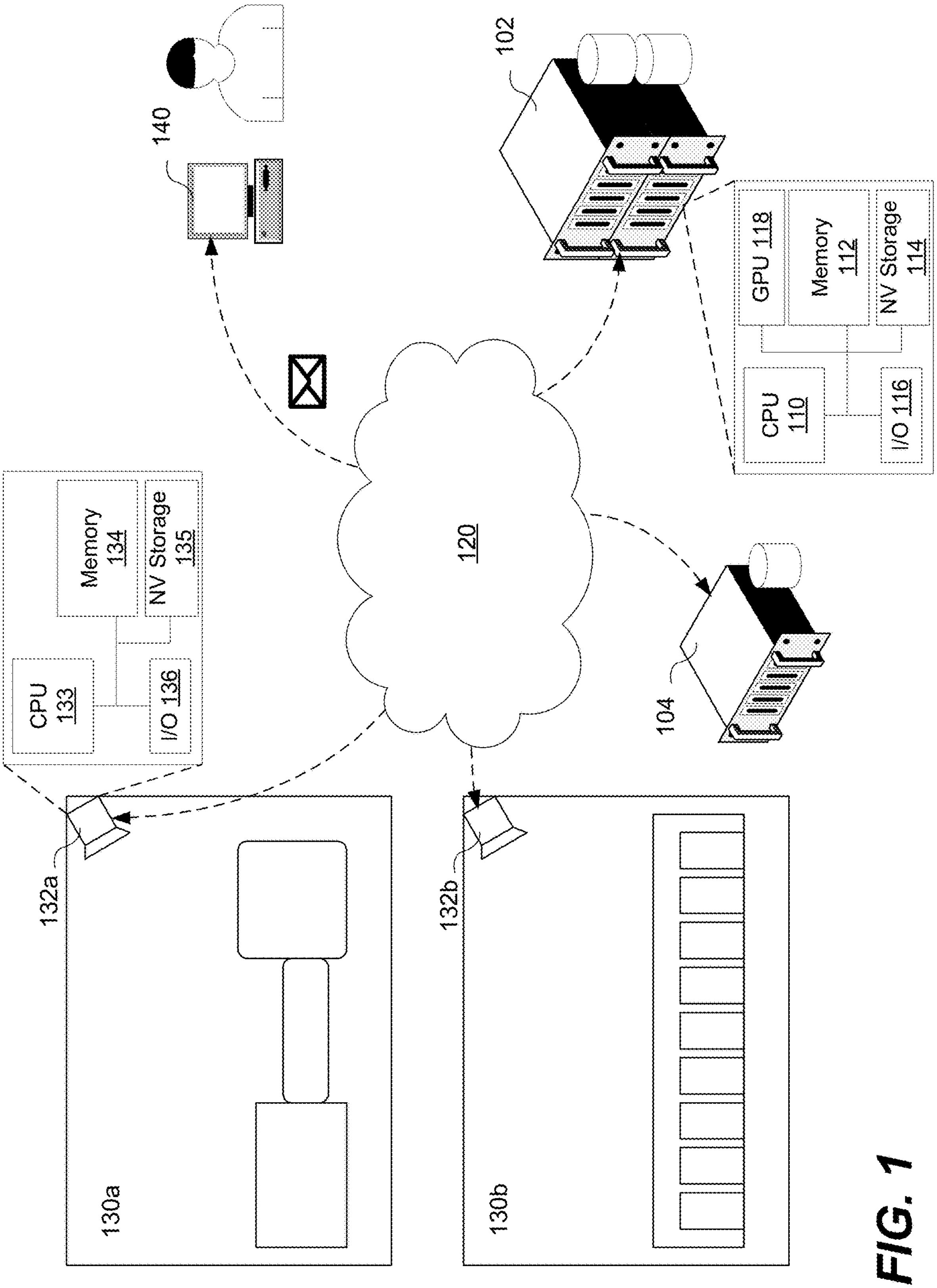
FIG. 1 shows a representation of an anomaly detection system.

FIG. 1 shows a representation of an anomaly detection system. The system comprises one or more servers 102 communicatively coupled with cameras 132*a*, 132*b* over communications network 120 (e.g. the Internet). The cameras 132*a*, 132*b* are configured to capture image data of a physical asset, which may be associated with a building (e.g. an area of a room), a site (e.g. a manufacturing/industrial/mining site), a piece of equipment, etc. As shown in FIG. 1, the cameras 132*a*, 132*b* are located in rooms 130*a*, 130*b* and configured to capture an image of an area of the rooms 130*a*, 130*b*, including equipment therein. The cameras 132*a*, 132*b* may be thermal cameras configured to capture thermal image data, near-infrared cameras configured to capture light outside the visual range, and/or RGB cameras configured to capture visual image data. The cameras 132*a*, 132*b* may capture single images, or a stream of images as a video.

In accordance with the present disclosure, the server(s) 102 are configured to receive the image data from the cameras 132*a*, 132*b*, and perform an anomaly detection method to determine if an anomaly is present in the image data (e.g. classify the image data as anomalous or nominal) using an artificial intelligence model, thus determining the presence of an anomaly within the rooms 130*a*, 130*b* or the equipment therein. The rooms 130*a*, 130*b* may for example be electrical/mechanical rooms, but it will be appreciated that cameras can be installed in various physical locations to identify anomalies associated with physical assets, including but not limited to buildings or rooms of buildings such as a warehouse, a hospital, a mechanical room, a server room, an electrical room, etc., and/or sites such as an underground cable tunnel, a manufacturing site, an industrial site, a mining site, etc. The cameras 132*a*, 132*b* in this example representation are configured to capture image data associated with equipment in the rooms 130*a*, 130*b*. The rooms 130*a*, 130*b* may contain various equipment such as one or more generators, batteries, machines, utility cabinets, HVAC units, etc. It will be appreciated that equipment being monitored can vary according to the particular application/implementation. For example, a mining site may comprise equipment such as crushers, conveyors, etc., as well as other physical assets such as high-pressure shipping containers with oxygen, etc., that may be monitored. It will be appreciated that there may be multiple cameras configured to capture image data of the same physical asset and/or equipment, and that the cameras 132*a*, 132*b* can be configured to capture image data of a room with no equipment in it, and/or to capture image data of equipment outside of a physical room.

In accordance with the present disclosure, the server(s) 102 are configured to implement an anomaly detection method that comprises determining a probability of a physical anomaly being present in the image data using an artificial intelligence model that is trained to detect anomalous image data. By determining if an anomaly is present in the image data, a near real-time warning of the anomaly can be output without requiring manual inspection of the physical asset to first detect the anomaly. An anomaly could be anything present in the building, at the site, or associated with equipment that should not be there in a normal situation. For generator rooms, for example, an anomaly could be caused by a water leak, cooling unit leak, oil leak, injector leak, diesel probe leak, floor leak systems, etc. As described in more detail below, the artificial intelligence model that is trained to detect anomalous image data may be trained using image data representing normal operating conditions, and thus the artificial intelligence model can detect when anything outside of normal is present in the image data.

The systems and methods disclosed herein provided by the server(s) 102 can be further configured to determine/classify the physical anomaly as a specific type of anomaly, for example by using one or more secondary artificial intelligence models trained to predict one or more types of anomalies, and/or by using a deterministic algorithm that applies one or more rules to the image data. As an example, the one or more secondary artificial intelligence models may comprise a classifier such as a YOLO neural network classifier to compare the object in a detected anomaly zone with known objects and indicate if it's a human, an animal or other common objects. The one or more secondary artificial intelligence models may additionally or alternatively comprise a multi-modal generative AI model that can receive multiple types of inputs, and can also generate various outputs related to the anomaly prediction. In some aspects, audio data may also be received from an audio capture device such as a microphone (not shown) associated with the physical asset and used to predict the specific type of anomaly. In some aspects, vibration data may also be received from a vibration sensor (not shown) associated with the physical asset and used to predict the specific type of anomaly. Various prompts may be provided to the multi-modal generative AI model and used for prediction and/or specifying desired output data. The prompts may be stored at the server(s) 102 and automatically called or triggered depending on the anomaly detection. Additionally or alternatively, the server(s) 102 may also provide a user interface that a user can interact with to investigate alerts and provide prompts. The prompts may for example include a prompt comprising textual data describing the context of the image data, and/or prompts specifying desired output data. One or more of the secondary artificial intelligence models may be hosted on a separate server (e.g. server 104) and the server(s) 102 may communicate with the server 104 and run said model(s).

Additionally, auxiliary data may be received from one or more sensors associated with the physical asset, which may be used for predicting the specific type of anomaly. For example, the system may receive light switch data indicative of whether a light in the room 130*a* or 130*b* is turned on. The system may determine, using said secondary artificial intelligence model(s) and/or a deterministic algorithm, that based on a shape of the physical anomaly detected, in conjunction with the information that the light is on when it is normally off, the anomaly is a human present in the room. For example, a classifier may learn or be trained to identify that if a light is on, a human is present in the room and the anomaly detection system may filter out events while the light is on and thus only monitor anomalous activities while the light is off (i.e. under normal operations). Another example of using auxiliary data may comprise receiving data from an IoT connectivity event hub. The system could detect that a user has scanned their card to access the room and therefore pause anomaly detection until the person leaves the room based on an event of door open and close. Another example may be that when scheduled maintenance is being performed on equipment, the anomaly detection system could consult a rules engine and establish how critical alerts are supposed to be handled during the course of maintenance.

It is worth noting that the present disclosure is concerned with detecting physical anomalies associated with physical assets (e.g. associated with a physical location such as a building, room, or site, and/or associated with equipment) by analysis of image data acquired by the cameras. That is to say, the present disclosure is not concerned with identifying anomalies introduced by the camera, i.e. during image acquisition or processing. Accordingly, the present disclosure is not concerned with detecting anomalies to determine if a camera is functioning properly, but rather to detect a physical anomaly associated with a physical asset captured in image data.

As described above, the server(s) 102 are configured to receive the image data from the cameras 132*a*, 132*b*, and to determine if an anomaly is present in the rooms 130*a*, 130*b* and/or associated with equipment in the rooms by analyzing the image data using an artificial intelligence model. The servers 102 each comprise a CPU 110, a non-transitory computer-readable memory 112, a non-volatile storage 114, an input/output interface 116, and graphical processing units ("GPU") 118. The non-transitory computer-readable memory 112 comprises computer-executable instructions stored thereon at runtime which, when executed by the CPU 110, configure the server to perform an anomaly detection method on image data as described in more detail herein. The non-volatile storage 114 has stored on it computer-executable instructions that are loaded into the non-transitory computer-readable memory 112 at runtime. The input/output interface 116 allows the server to communicate with one or more external devices (e.g. via network 120), including cameras 132*a*, 132*b*, external server(s) 104, as well as an operator device 140. The non-transitory computer-readable memory 112 also comprises an artificial intelligence model that is trained to classify the image data as being normal or containing an anomaly. The non-transitory computer-readable memory 112 may also store one or more secondary artificial intelligence models that analyzes the image data to determine a specific type of anomaly present in the image data. The GPU 118 may be used to control a display and may be used to run the artificial intelligence model(s) to analyze the image data and determine a probability of an anomaly being present in the image. When the probability of the anomaly being present in the image exceeds a threshold value, the servers 102 may output an alert to operator device 140, such as by sending an email, text, call, other message, etc. Further, the server(s) 102 may run one or more secondary artificial intelligence model(s) to determine a specific type of anomaly present in the image data, which can also be output to the operator device 140. It will be appreciated that there may be multiple servers 102 implemented to perform the anomaly detection methods. Multiple servers 102 may be networked together and collectively perform the anomaly detection method using distributed computing. In some aspects, as noted above, one or more artificial intelligence models may be stored at a separate server 104. The computing components of the server 104 are similar to those shown for server(s) 102.

The cameras 132*a*, 132*b* also have hardware components for capturing the image data, processing the image data, and sending the image data to the servers 102. As shown for camera 132*a*, the hardware components include CPU 133, non-transitory computer-readable memory 134, non-volatile storage 135, and input/output interface 136. It is also possible that in certain implementations, the cameras 132*a*, 132*b* may be configured to analyze image data themselves before sending to the servers 102, and have appropriate processing capabilities thereon.

Figure 2:
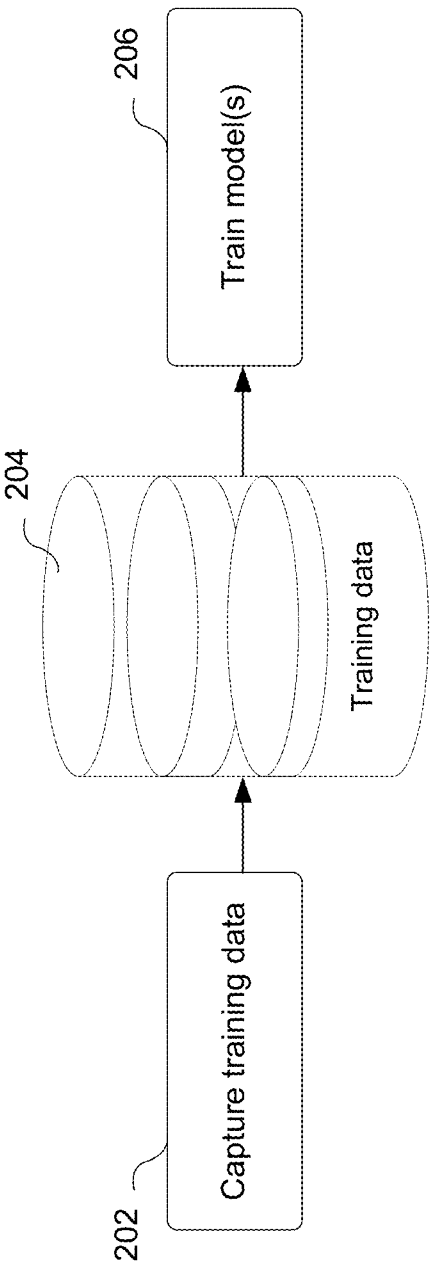
FIG. 2 shows a flow diagram for training an anomaly detection model.

FIG. 2 shows a flow diagram for training an anomaly detection model. As described above, the anomaly detection model comprises a first artificial intelligence model that is trained to detect anomalous image data. The anomaly detection model may further comprise one or more secondary artificial intelligence models to predict a specific type of anomaly present in the image data.

As shown in FIG. 2, training data is captured/obtained (202). The training data is obtained from one or more cameras configured to capture image data of the physical asset to be monitored. The training data used to train the artificial intelligence model that detects anomalous image data comprises normal image data, and may be obtained from the one or more cameras configured to capture images for a pre-set period of time under normal operating conditions. For example, image data may be captured over a period of one day to multiple days, and when the artificial intelligence model is to be used to detect anomalies associated with equipment, the equipment may be run in different operating modes (e.g. off/on states, and/or run under different operating modes) during this period when the image data is captured. The normal image data is stored as training data (204), and used to train the artificial intelligence model to determine a probability of a physical anomaly being present in subsequent image data (206).

Multiple techniques may be used to increase accuracy of the model. As one example, small variations of raw training data may be injected in order to induce noise and movement of the images ingested by the system. This makes the system more reliable on vibration that could occurs when a generator or other equipment is running. Various transformations to the image data may also be applied, such as brightness adjustment of a few levels up and down, constraints, etc., in order to cover a wider range of potential variation in the images captured by the cameras. Another approach to help filter out anomalies is to apply auto segmentation of the image to extract masks. This allows the system to increase the score of anomalies for events detected on the floor compared to other locations less probable for the type of events intended to be captured.

In accordance with the present disclosure, the first artificial intelligence model trained to detect anomalous image data is not necessarily trained to classify specific types of anomalies, but rather to learn what is considered normal image data, and to determine when there is anything anomalous in the image data that deviates from the normal image data. Of course, a stand-alone artificial intelligence model could be further trained to identify specific types of anomalies in addition to determining when image data is anomalous, and the training data captured at 202 and stored at 204 may comprise image data of examples of anomalies to help improve further anomaly detection, e.g. water dripping on the floor. However, training a model to determine specific types of anomalies generally rely upon a large amount of manually labelled data, and such image data may be difficult to obtain (for example, there may only be so many images of oil leaks of for generators within a specific operating environment). Training the first artificial intelligence model using normal image data such that the artificial intelligence model is trained to classify anything anomalous in the image data was found to improve the accuracy of detecting any anomaly while requiring less training data. In an example implementation, the artificial intelligence model may be an algorithm supported by Anomalib. Numerous algorithms available within the Anomalib package were evaluated, and CFA was found to be suitable in light of its memory consumption and computer usage that allowed for scalability. PADIM was also initially considered to be a suitable algorithm, but the memory requirements increased exponentially as the number of supported points of view were trained.

One or more secondary artificial intelligence models may be trained to predict/determine that an anomaly is a specific type of anomaly. The specific types of anomalies can be determined through training of the one or more secondary artificial intelligence models over time, based on manual labelling of image data that has been identified to contain a physical anomaly. The training data captured at 202 and stored at 204 may thus comprise image data representative of various anomalies and be used to train the one or more secondary artificial intelligence models to classify specific types of anomalies. As an example, a YOLO classifier may be trained to classify and prioritize anomalies or to filter out common expected abnormalities (e.g. humans, tools, etc.).

The model may be trained to perform image segmentation to classify specific types of anomalies. As an example, a model could be trained to establish confidence that the location and shape of the anomalies are a leak. For example, the system could extract a coordinate of the leak and establish that it is indeed on the floor. Then the model (or a further model) could appreciate the typical pattern of leaks based on trained models. The typical pattern of leaks may be determined using randomly generated physical possible leaks on a digital twin replica or a bank of images of typical leaks. The same method could also be applied for other type of anomalies, for example fire, animals, trip hazards, etc. Additionally or alternatively, the second artificial intelligence model may be a multi-modal generative AI model, that can receive multiple types of inputs (images, video, audio, text), predict the type of anomaly present, and generate various outputs. The training data captured at 202 and stored at 204 would comprise training data for these different types of inputs collected over time. As one example, the training data for additional types of inputs may comprise audio data of different alarms in a building. The multi-modal generate AI model may be an existing model that is trained specifically using training data associated with physical assets as disclosed herein, or a custom-built and trained model.

Advantageously, with the implementation of an anomaly detection model comprising a chain of artificial intelligence models as described above, the models can help one another learn. By chaining multiple AI models a more accurate final prediction can be created compared to taking only one single approach. A wide array of probabilities from each model can be combined and patterns can be derived that would better assess the situation and provide more accurate prediction for the operators. The training process can also be automated to avoid labelling or identifying by hand the context for each point of view saving numerous man hours of manually executing these tasks. The first artificial intelligence model can produce labelled data that the secondary artificial intelligence model(s) can consume to learn what anomalies look like, and the secondary artificial intelligence model(s) can provide new normal frames that would otherwise look like a false-positive (for example, a recognizable tool left on site), which can be added to the training images and used to update the first artificial intelligence model. Model chaining reduces the probability of triggering false positive by increasing the number of inputs used to calculate the final score of the prediction. This chain of decision can be customized for wider scenarios and specific special context for rooms that would by atypical. This approach drives more value for the operators as they receive fewer false alarms in the end.

Figure 3A:
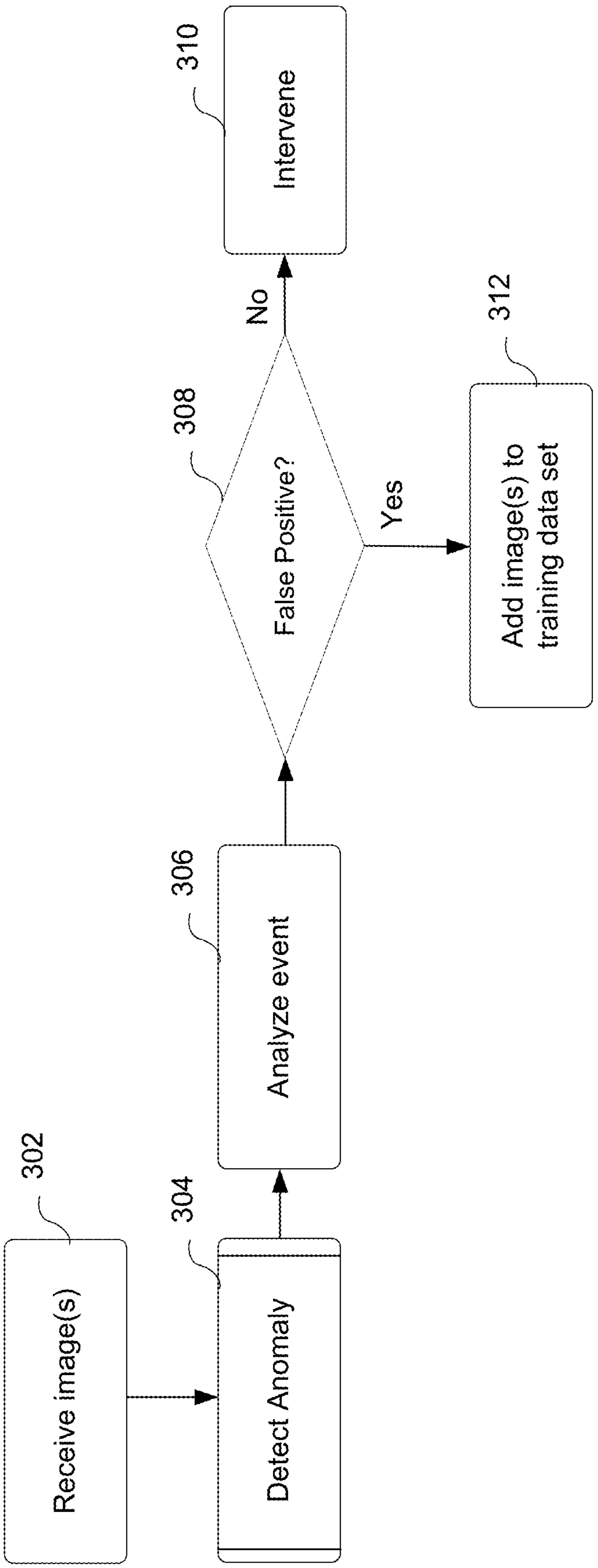
FIGS. 3A-C show flow diagrams for detecting physical anomalies present in image data.
Figure 3B:
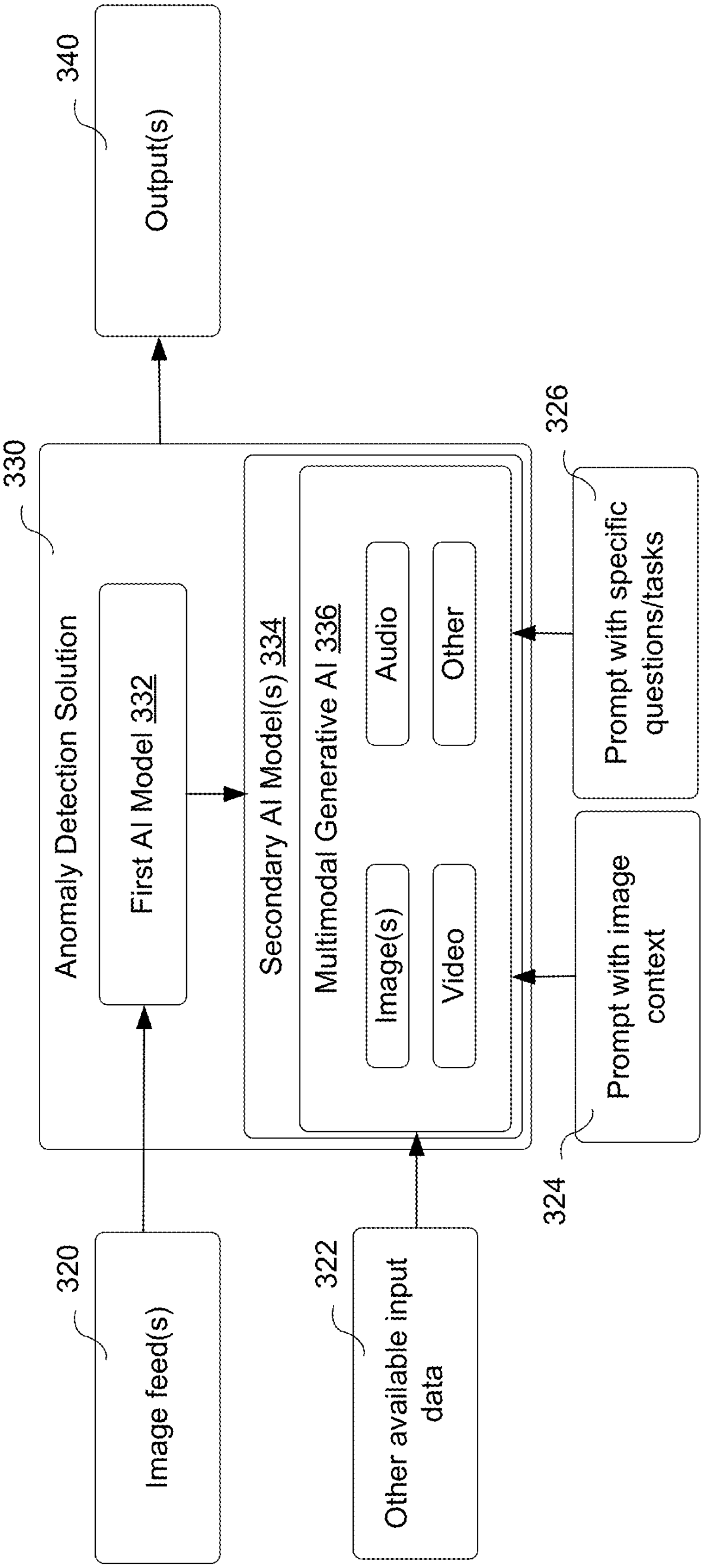
Figure 3C:
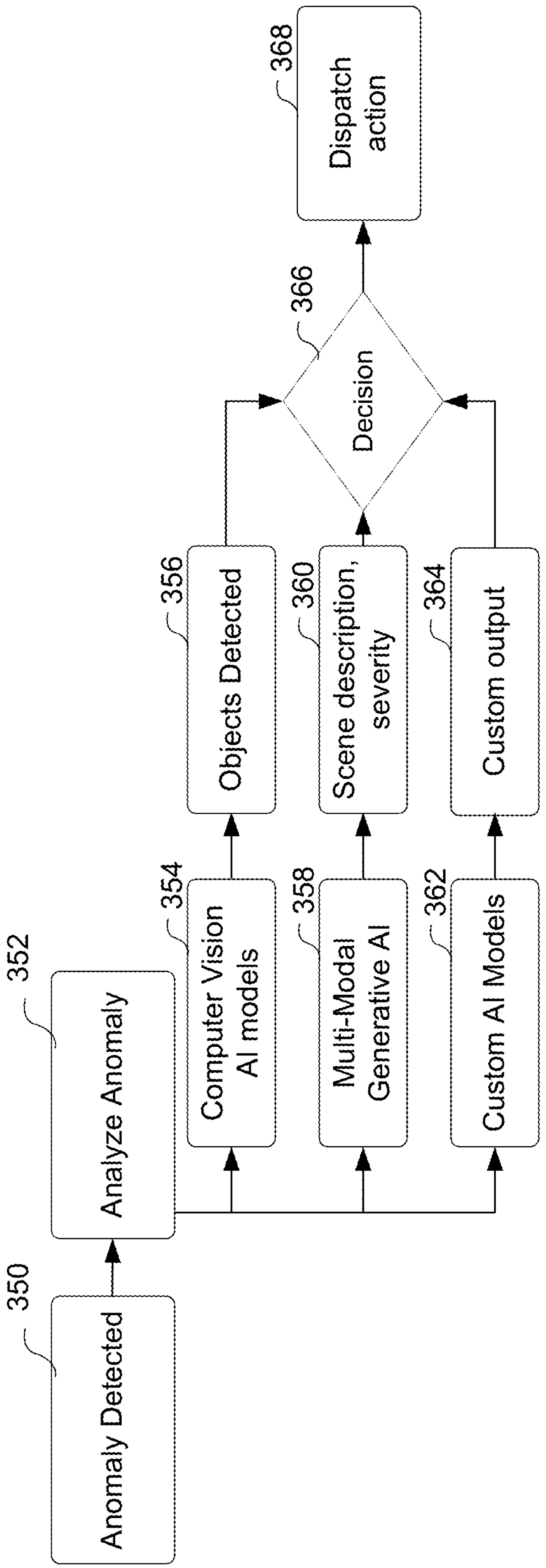

FIGS. 3A-C show flow diagrams for detecting physical anomalies present in image data in accordance with the anomaly detection systems and methods disclosed herein.

FIG. 3A shows a first flow diagram for detecting a physical anomaly in image data. One or more images are received (302). The image data is classified to detect an anomaly (304). As described above, an anomaly detection model comprises an artificial intelligence model trained to classify the image data as anomalous and is used to determine a probability of a physical anomaly being present in the image data. For example, the artificial intelligence model may determine a percentage likelihood that the image data is normal or not normal. Further, when it is determined that the image contains a physical anomaly (i.e. when the probability of the physical anomaly being present in the image exceeds a threshold value), a further determination may be made as to the specific type of physical anomaly that is present in the image, for example using one or more secondary artificial intelligence models, one or more rules, etc. Example flow diagrams for detecting an anomaly at 304 is described further with reference to FIGS. 3B and 3C.

When the probability of the physical anomaly being present in the image exceeds a threshold value, an alert is generated to indicate an anomaly event. The event may be analyzed (e.g. by a human operator) (306), who would review the image and confirm the presence of the physical anomaly and optionally the specific type of physical anomaly present in the image. A determination is made as to whether the anomaly detection model classification yielded a false positive (308). If there is no false positive (NO at 308), that is, there is indeed a physical anomaly present in the image, the operator can send instructions/communications for personnel to intervene to address the anomaly associated with the physical asset (310).

If however the operator determines that the classification is a false positive (YES at 308), for example because the anomaly detection model classification was incorrect, or because the operator wishes for this anomaly to be within the realm of normal operating conditions, the image(s) can be added back to the training data set (312) and used to retrain the anomaly detection model as described above with reference to FIG. 2. Advantageously, the anomaly detection model can be readily re-trained to learn false-positives to be normal.

FIG. 3B shows a further flow diagram for detecting a physical anomaly in image data. The flow diagram shown in FIG. 3B may for example correspond to the processing performed in anomaly detection (304) in FIG. 3A.

Image feed(s) (320), comprising one or more images captured by one or more cameras, are provided to a first artificial intelligence model (332) of an anomaly detection solution (330). The first artificial intelligence model (332) is trained to detect anomalous image data and determine a probability of a physical anomaly being present in the image data.

When an anomaly is detected (i.e. the probability of a physical anomaly being present in the image data exceeds a threshold value), one or more secondary artificial intelligence models (334) may be used to determine that the physical anomaly is a specific type of anomaly. In the example representation shown in FIG. 3B, the secondary artificial intelligence model(s) (334) comprises a multimodal generative AI model (336). The multimodal generative AI model (336) can process multiple types of input data, including images, video, audio, and other data (e.g. textual data, vibration data, etc.). The multimodal generative AI model (336) receives the image data from the image feed(s) (320) and any other available input data (322) (e.g. audio data, vibration data, other sensor data, etc.). The multimodal AI model (336) may also receive prompts for performing the analysis and generating appropriate outputs, such as a prompt with image context (324) and/or prompts with specific questions or tasks (326).

For example, a prompt providing image context (324) to the multimodal generative AI (336) may be as follows: You are a system in charge of assessing how critical alerts from a generator room monitored by CCTV. You will receive highlighted area of interest, you need to analyze the highlighted zone and indicate one of the following: (1) You are unable to identify the root cause in the received image, a human operative will need to be analyzing the situation; (2) You are able to identify the root cause of the anomaly and it's not critical. For example a ladder has been left in the middle of the room. There is no immediate danger but the ladder shouldn't be there none the less. So emit a warning; (3) You are able to identify the root cause of the anomaly and it's a problem that should be addressed by the technical team asap. Describe what you perceive and emit a alert.

Further, special context can be included in the prompt providing image context (324), for example if a room has a special situation. An example could be a window that shows an external dynamic scene. Typically, this area would be digitally masked, but the generative AI (336) could still receive the prompt instruction that a zone has been masked and it's normal. Another example of special context could be a specific equipment that may have numerous tools or objects around the area and often trigger anomalies. (The tools or other objects around the area could instead be labelled normal and used to retrain the models, as described above, and thus avoid this prompt).

The prompts with specific questions or tasks (326) may be automatically triggered. The prompts with specific questions or tasks (326) may in particular be prompts to generate an output comprising a description of the specific type of anomaly, and/or a suggested action for responding to the specific type of anomaly. For example, prompts with specific questions or tasks may be:

Is the anomaly in the zone of interest a leak or fire or person?

Classify the analysis of images/videos/sounds as results to prioritize the anomalies, e.g. normal in a generator room (tools, person standing, ladder, etc.), abnormal in a generator room (person lying on the floor, weapon, animal, etc.), typical anomalies linked to leaks (fire, smoke, electrical sparks, severe physical hazards, etc.).

Describe how big the leak is and/or a severity of the leak.

Link the anomaly to a maintenance/repair schedule.

Describe the anomaly in a summary fashion, such as an alert ticket to a support desk/office (with attached content) to help support staff confirm/take actions.

Once the anomaly is resolved, document/close the ticket, and add learnings to a database for knowledge transfer/sharing.

Once the anomaly is resolved, create a feedback loop with false positives, confirmed anomalies, etc.

The anomaly detection solution (330), based on the determinations by the first artificial intelligence model (332) and the one or more secondary artificial intelligence models (334), generates an output (340). The output (340) may for example be an alert comprising an image with the anomaly highlighted, and an indication of the specific type of anomaly, a percentage confidence, etc. The output (340) may also comprise any other description generated by the generative AI model (336), for example depending on the prompts with specific questions/tasks (326).

The prompts may be generated in advance by a development team based on the tasks needed to evaluate the image data, and may be automatically called based on pre-configured prompt. A collection of prompts can be built over time and depending on the physical assets being monitored and specific prompts could be reused.

An anomaly detection system interface may also allow end-users to ask specific questions. For example, a user may be able to ask specific questions such as: What did this room look like before the alerts? Was a door open prior to the alerts within the last hour of the alert? Etc.

FIG. 3C shows a further flow diagram representing how multiple AI models can be used to detect an anomaly in image data.

An anomaly is detected (350) using a first artificial intelligence model as described above. The anomaly is analyzed (352) using one or more secondary artificial intelligence models. The one or more secondary artificial intelligence models can be used to determine the specific type of anomaly present as the detected anomaly, as well as provide additional information such as how critical the anomaly is and what actions should be taken based on the determinations.

Analyzing the anomaly using the secondary artificial intelligence models can be performed by chaining a number of specialized AI models. As represented in FIG. 3C, computer vision AI models (354) may be used to detect objects (356) and determine the specific type of anomaly present. A multi-modal generative AI (358) may be used to output a scene description, severity of the anomaly, etc. (360). Additional models, including custom AI models (362) may provide additional/custom outputs (364). The goals of these AI models is to provide contextual information about the anomaly and provide output to a decision module (366) to decide what to do about the anomaly.

The decision module (366) receives the output from the various AI models and decides what action should be taken with respect to the anomaly. The decision module (366) may be a typical business rule engine or another generative AI that have some rules applied to help handle the solution. The AI models emit a statistical analysis about how confident they are about a prediction with respect to the detected anomaly. In the case of conflicting information weight and accuracy will be considered by the decision module rule engine. For example, if images show leaks but the audio sounds normal, the image analysis would have precedence over audio analysis. On the other hand, if an abnormal mechanical noise was detected compared to regular operation, then even if the image analysis doesn't show an abnormal feature the decision module (366) may send an audio snippet to the operator for them to assess abnormality of the audio. The output and appropriate action generated by the decision module is dispatched (368).

FIG. 4A-4M show examples of images used for training and testing the anomaly detection model. As used herein, a "test" image refers to an image input to the artificial intelligence model on which analysis/classification is performed, while a "training" image refers to an image input to the artificial intelligence model to train the artificial intelligence model in order to perform that analysis/classification. A generic reference to an "image" may refer to a test and/or a training image, depending on the context.

Figure 4A:
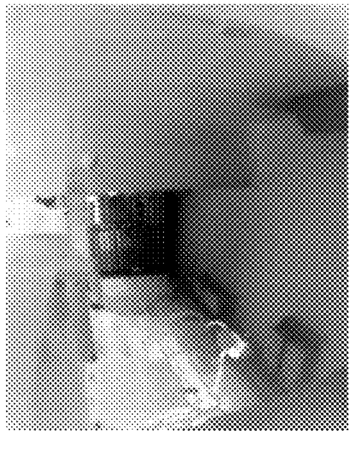
FIG. 4A-4M show examples of images used for training and testing the anomaly detection model.
Figure 4B:
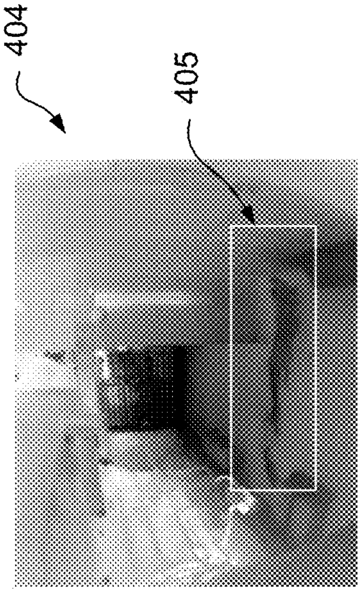
Figure 4C:
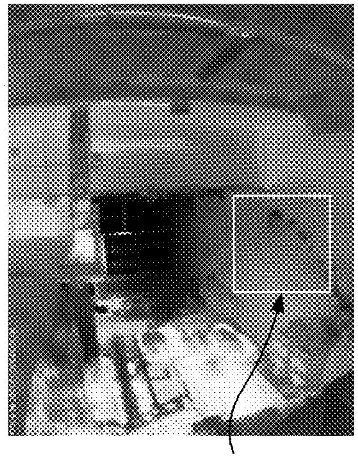
Figure 4D:
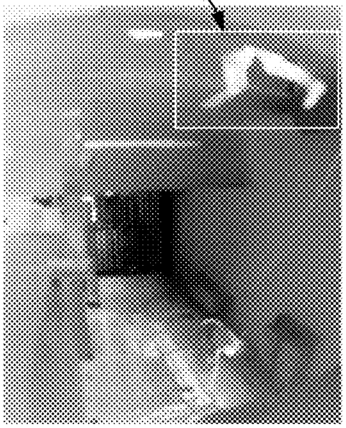

FIG. 4A shows a training image 402 comprising a normal thermal image taken of a room. FIG. 4B shows a test image 404 showing a cold leak 405 in the room detected by the anomaly detection model. FIG. 4C shows a test image 406 showing puddles 407 in the room detected by the anomaly detection model. FIG. 4D shows a test image 408 showing a human 409 in the room detected by the anomaly detection model.

Figure 4F:
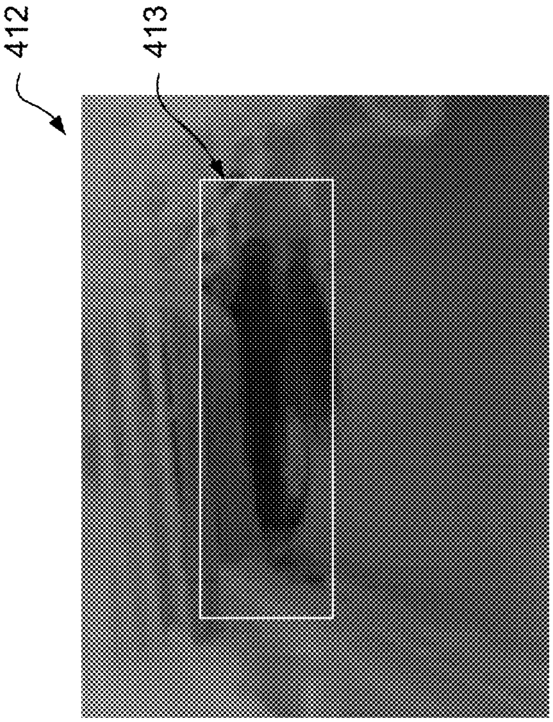
Figure 4E:
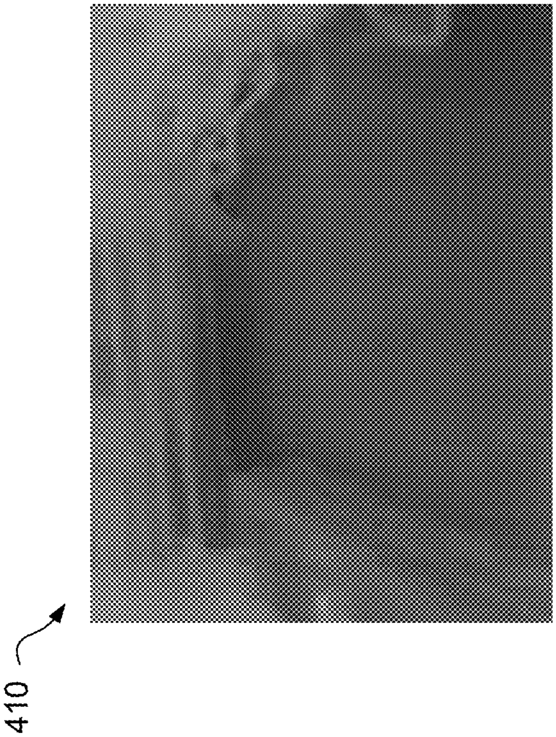

FIG. 4E shows a training image 410 comprising a normal thermal image taken of a room. FIG. 4F shows a test image 412 showing a leak 413 in the room detected by the anomaly detection model.

Figure 4H:
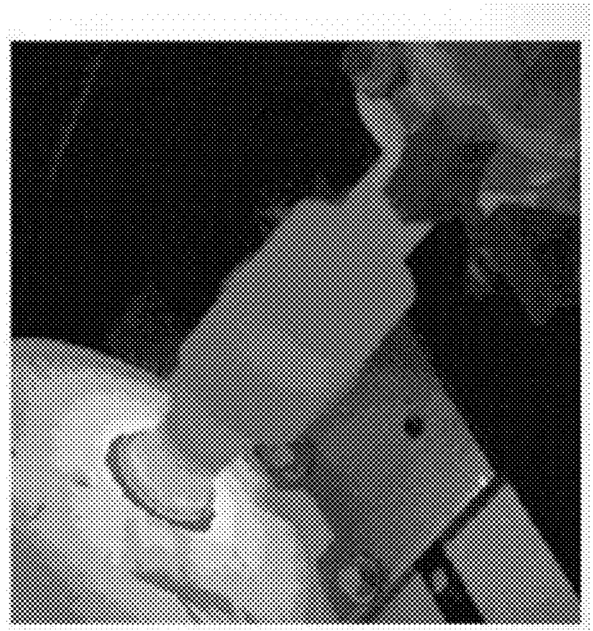
Figure 4G:
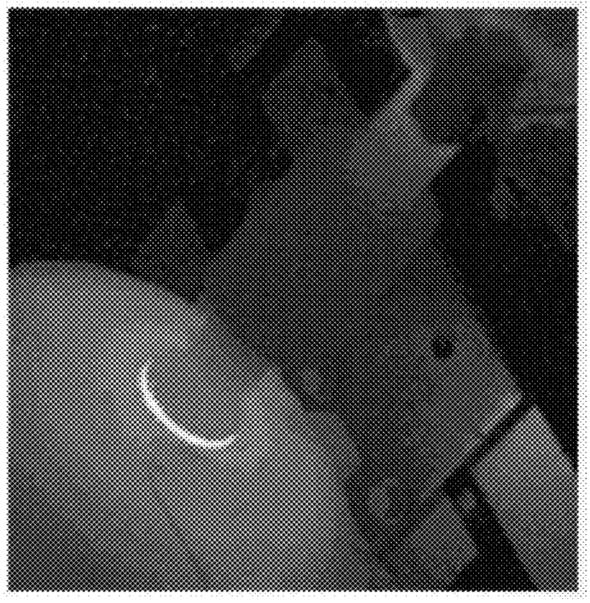

FIG. 4G shows a training image 414 comprising a thermal image of a piece of a generator taken under normal conditions. FIG. 4H shows a test image 416 showing that the piece of the generator is overheating.

Figure 4I:
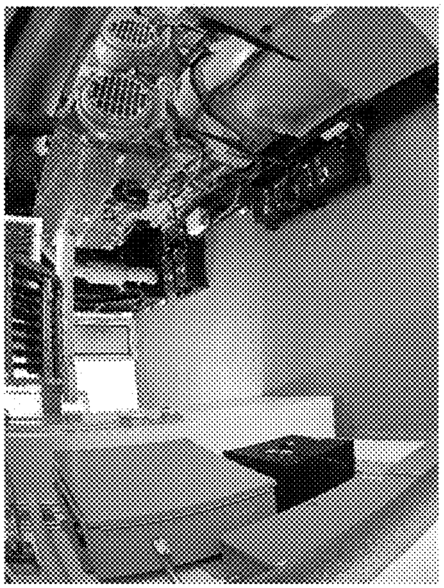
Figure 4J:
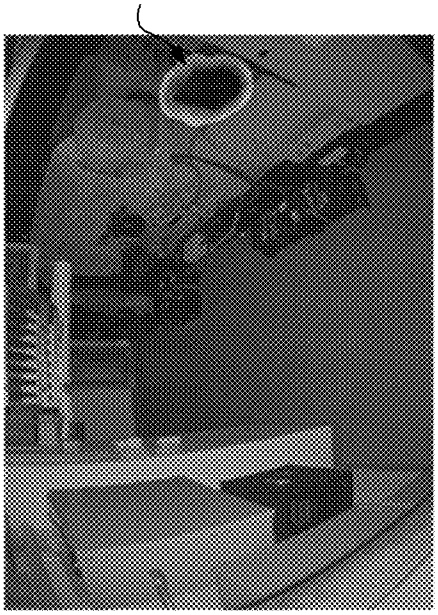
Figure 4K:
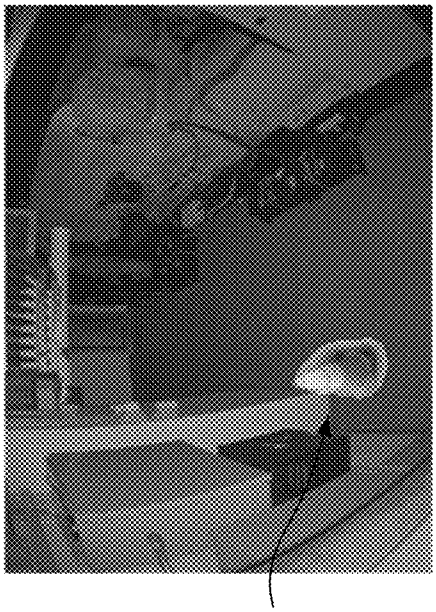

FIG. 4I shows a training image 418 comprising an RGB image of a generator room taken showing normal conditions. FIG. 4J shows a test image 420 showing an anomaly 421 (in this image, a garbage can) detected by the anomaly detection model. FIG. 4K shows a further test image 422 showing an anomaly 423 (in this image, a cone) detected by the anomaly detection model.

Figure 4M:
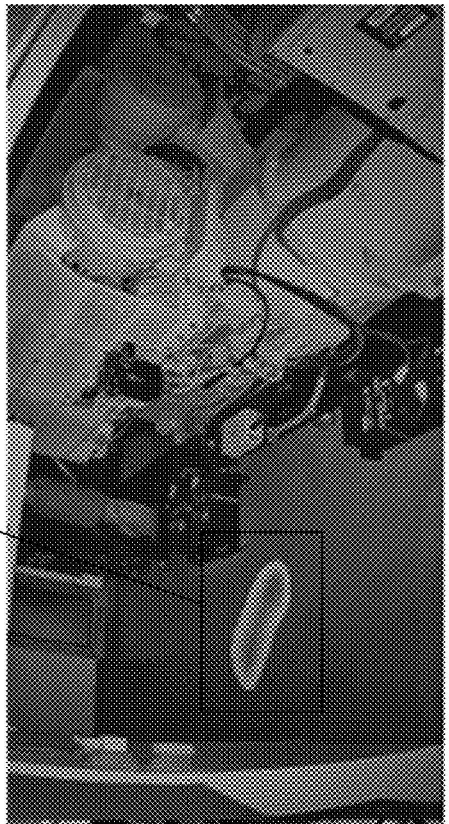
Figure 4L:
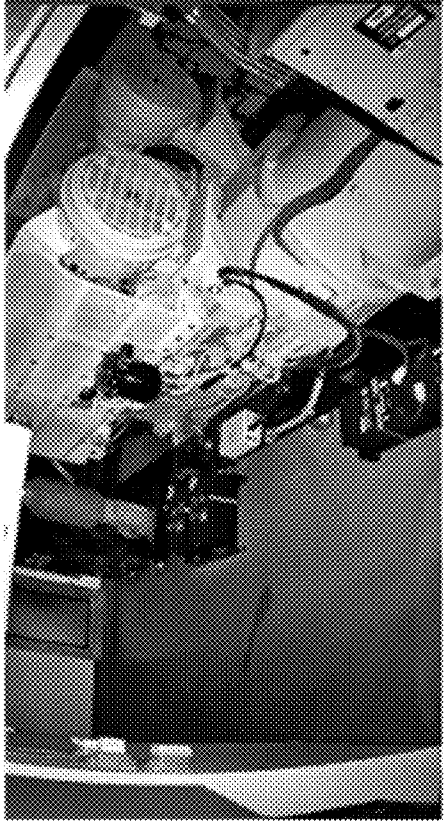

FIG. 4L shows a test image 424 comprising a greyscale RGB image of a generator room. The RGB images captured by the one or more cameras may be converted to greyscale to facilitate anomaly detection by the anomaly detection model. FIG. 4M shows a corresponding image 426 with a leak 427 highlighted.

The anomaly detection model may provide an output comprising the image in which the anomaly is detected and highlighting the anomaly detected in the image, and optionally a confidence of the presence of the anomaly and/or type of anomaly. For example, in images 420 and 422, an output image may place a square surrounding the anomaly/object with an automatic label that may say: Garbage Can 97.43% and Cone 99.98%, respectively.

Figure 5A:
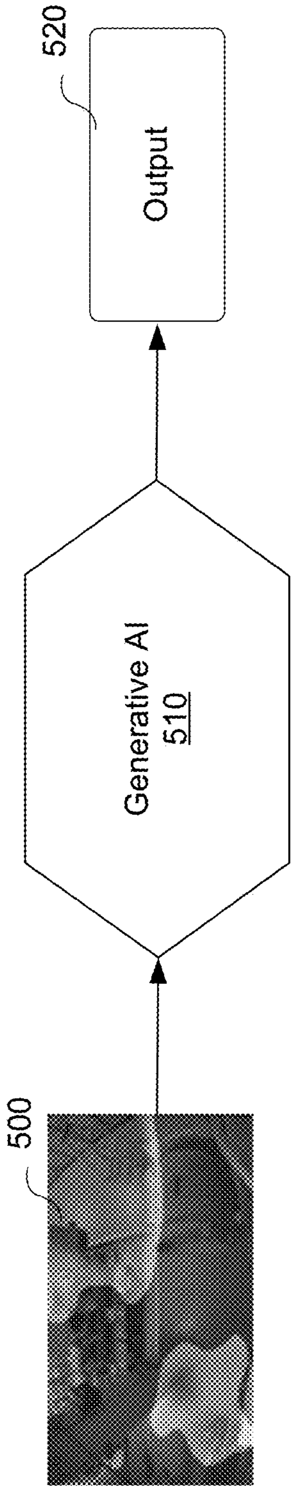
FIGS. 5A and 5B show a representation of inputs and outputs using a generative AI model.
Figure 5B:
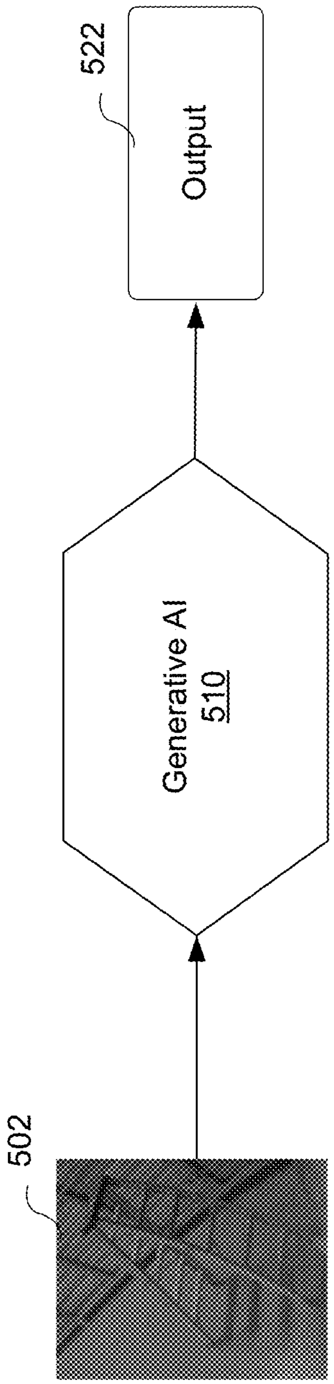

FIGS. 5A and 5B show a representation of inputs and outputs using a generative AI model. As described above, the anomaly detection model may comprise a generative AI model component, and can generate various outputs based on various input prompts. The input prompts may be automatically triggered once anomalous image data is detected.

FIG. 5A shows an image 500 that has been identified as anomalous. An input prompt to the generative AI 510 may be: This is the output of anomaly detection, where the blue and green zone are what is considered an anomaly compared to that what is a normal state of the room. The room is a generator room. The anomaly can be caused by one of the following types of events: Human present in the room; Object has been put in the room that was not there before; Leak or incident can have altered the environment. To the best of your knowledge taking into account what the room would normally look like, can you assess what could be the anomaly identified at the nature of the anomaly? Do not make any assumption, identify only factual statement by your ability to identify what is in the picture. If you are uncertain, mention it. If the cause is an object that is not there before please identify the object in question. The generative AI 510 may then analyze the image 500 based on this prompt, and generate an output 520, such as: The anomaly detection highlights the following: Blue zone: the blue zone is located in the upper right corner of the image. It is likely caused by the presence of a ladder, which is not present in the normal image. Green zone: the green zone is located in the lower left corner of the image. It is likely caused by the presence of a blue container, which is not present in the normal image.

FIG. 5B shows an image 502 taken from the image 500. An input prompt to the generative AI 510 may be: Can you identify the object that could be present in this image? The generative AI 510 may then analyze the image 500 based on this prompt, and generate an output 522, such as: The object in the image is a ladder. By narrowing the anomalous region in the image 500, a more accurate anomaly cause can be determined.

Figure 6:
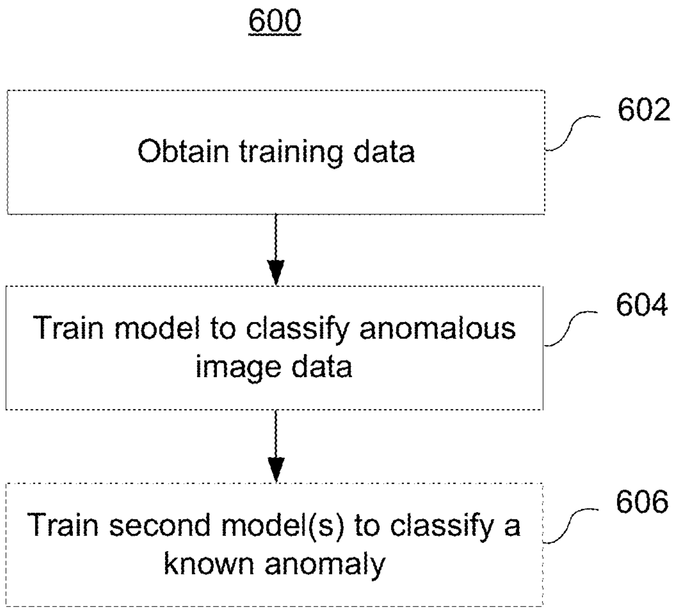
FIG. 6 shows a method of training an anomaly detection model.

FIG. 6 shows a method 600 of training an anomaly detection model. The method comprises obtaining training data (602). The training data in particular comprises training images, and may comprise single images or a stream of images (i.e. video data). To train a first artificial intelligence model, the training images comprise normal image data, and may be obtained from one or more cameras that have recorded images for a pre-set period of time under normal operating conditions. The cameras may be one or more of thermal cameras, near-infrared cameras, and RGB cameras. As different physical assets may have different normal operating conditions, training images may be obtained from multiple cameras capturing images of different physical assets, and the anomaly detection model is trained on the training images from each of the cameras. A first artificial intelligence model is trained to determine a probability of a physical anomaly being present in the image data, and can thus classify an image as being anomalous when a probability of a physical anomaly being present in the image with respect to the normal image data exceeds a threshold value (604).

One or more second artificial intelligence model(s) may also be trained to classify a type of anomaly present in an image (606). To train this second artificial intelligence model, training images are obtained at 602 comprising anomalous image data that have a known anomaly. In some aspects, as described above, the one or more second artificial intelligence models may comprise a multi-modal generative AI model. Training the multi-modal generative AI model may comprise obtaining additional training data at 602 comprising an additional input type; and training the multi-modal generative AI model at 606 to determine the known anomaly present in the anomalous image data based on the training images comprising anomalous image data and the additional training data. Training the multi-modal generative AI model at 606 may further comprise training the multi-modal generative AI model to generate outputs associated with the known anomaly in response to different input prompts.

Figure 7:
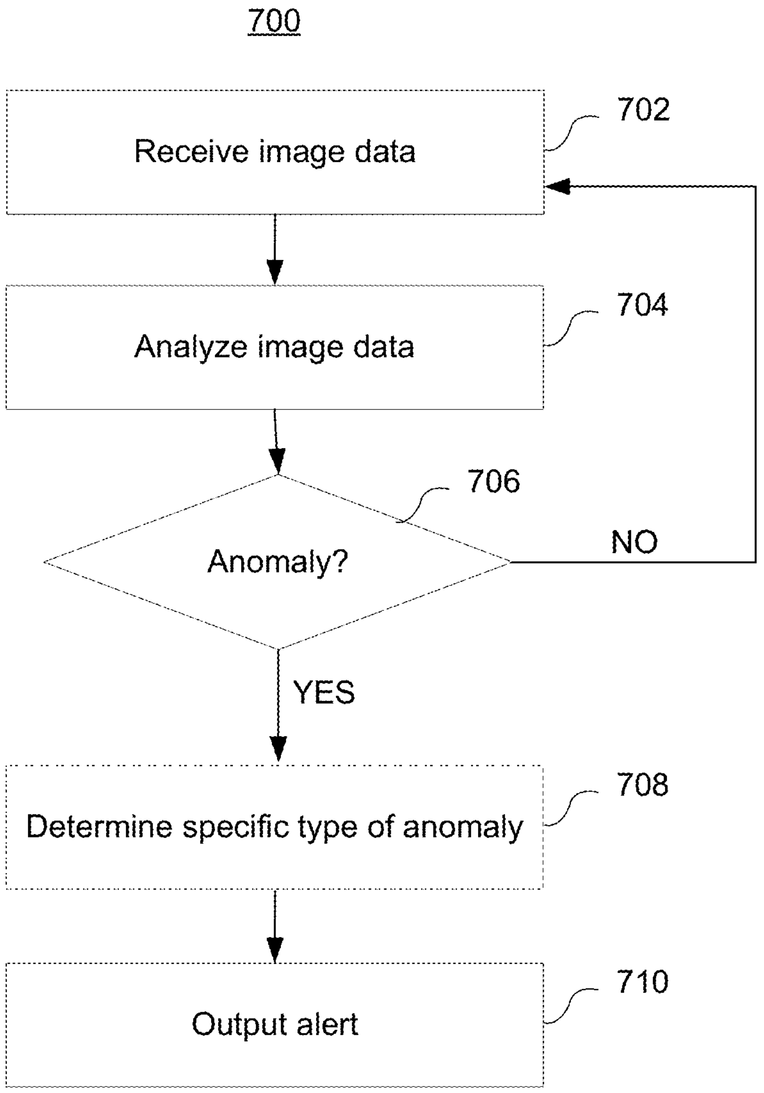
FIG. 7 shows a method of performing anomaly detection.

FIG. 7 shows a method 700 of performing anomaly detection. The method 700 may be performed by the one or more server(s) 102 shown in FIG. 1. A non-transitory computer-readable memory of the server(s) 102 may have computer-executable instructions stored thereon which, when executed by a processor, configure the server(s) to perform the anomaly detection method 700.

Image data is received from one or more cameras configured to capture an image of a physical asset (702). The one or more cameras may be configured to capture an image of an area of an area of a building, an area of a site, or a piece of equipment. For example, the building may comprise one of: a hospital, a warehouse, a mechanical room, a server room, and an electrical room. The site may comprise one of: an underground cable tunnel, a manufacturing site, an industrial site, and a mining site. The piece of equipment may be one of: a generator, a battery, a machine, a utility cabinet, and a heating, ventilation, and air conditioning (HVAC) unit. The image data may be received as a single image or a stream of images. The image may be received in association with metadata comprising one or more of a camera identifier and a camera location, so that the anomaly detection model can evaluate anomalies with respect to the camera identifier/camera location. The one or more cameras may comprise one or more of: thermal cameras, near-infrared cameras, and RGB cameras The image data is analyzed to determine a probability of a physical anomaly being present in the image using an artificial intelligence model that is trained to detect anomalous image data (704). Depending on the type of image data received, the anomaly may be detected as a thermal anomaly in the image data or a visual anomaly in the image data. A determination is made as to whether an anomaly is present in the image (706). The determination is made based on whether the probability of the physical anomaly being present in the image exceeds a threshold value. If there is no anomaly present in the image (NO at 706), i.e. the probability of the physical anomaly being present in the image does not exceed the threshold value, the method returns to 702 and continues to receive further image data. If there is an anomaly present in the image (YES at 706), i.e. the probability of the physical anomaly being present in the image exceeds the threshold value, an alert is output (710). In some implementations, the alert may include the image and a timestamp. The image may include an indicator to highlight the anomaly.

In some embodiments, when it is determined that a physical anomaly is present in the image (YES at 706), the method may comprises analyzing the image data to determine that the physical anomaly is a specific type of anomaly (708). For example, specific types of anomalies may include one or more of: equipment overheat, presence of a human, presence of an animal, misplaced tools or equipment, fire, flood, falling material, and leaks. Determining that the physical anomaly is the specific type of anomaly may comprise determining a probability that the physical anomaly is the specific type of anomaly using one or more secondary artificial intelligence models that are trained to predict the physical anomaly as being one or more types of anomalies. For example, the one or more secondary artificial intelligence models may comprise a model that is trained to perform image segmentation on the image data to classify the anomaly as being the specific type of anomaly. Additionally or alternatively, the one or more secondary artificial intelligence models may comprise a multi-modal generative AI model. In some aspects, the method may further comprise receiving a context of the image data, and the multi-modal generative AI model uses the context of the image data to determine the probability that the physical anomaly is the specific type of anomaly. In some aspects, the method may further comprise receiving audio data and/or vibration data associated with the physical asset, and the multi-modal generative AI model uses the received audio and/or vibration data to determine the probability that the physical anomaly is the specific type of anomaly. The multi-modal generative AI model may be configured to generate an output comprising one or both of: a description of the specific type of anomaly, and a suggested action for responding to the specific type of anomaly. Additionally or alternatively, determining that the physical anomaly is the specific type of anomaly may comprise applying one or more rules to the image data. Further, auxiliary data associated with the physical asset may be received from one or more sensors, and determining that the physical anomaly is the specific type of anomaly may be further based on the auxiliary data. The specific type of anomaly, along with other generated description o the anomaly, may also be included in the alert output at 710.

The method may further comprise updating/retraining the first and/or secondary artificial intelligence models as part of a feedback loop. For example, the method may further comprise receiving user feedback on the specific type of anomaly, and updating the one or more secondary artificial intelligence models based on the user feedback. Additionally or alternatively, the method may further comprise in response to outputting the alert, receiving user feedback that the image data is normal, and updating the artificial intelligence model based on the user feedback.

Figure 8:
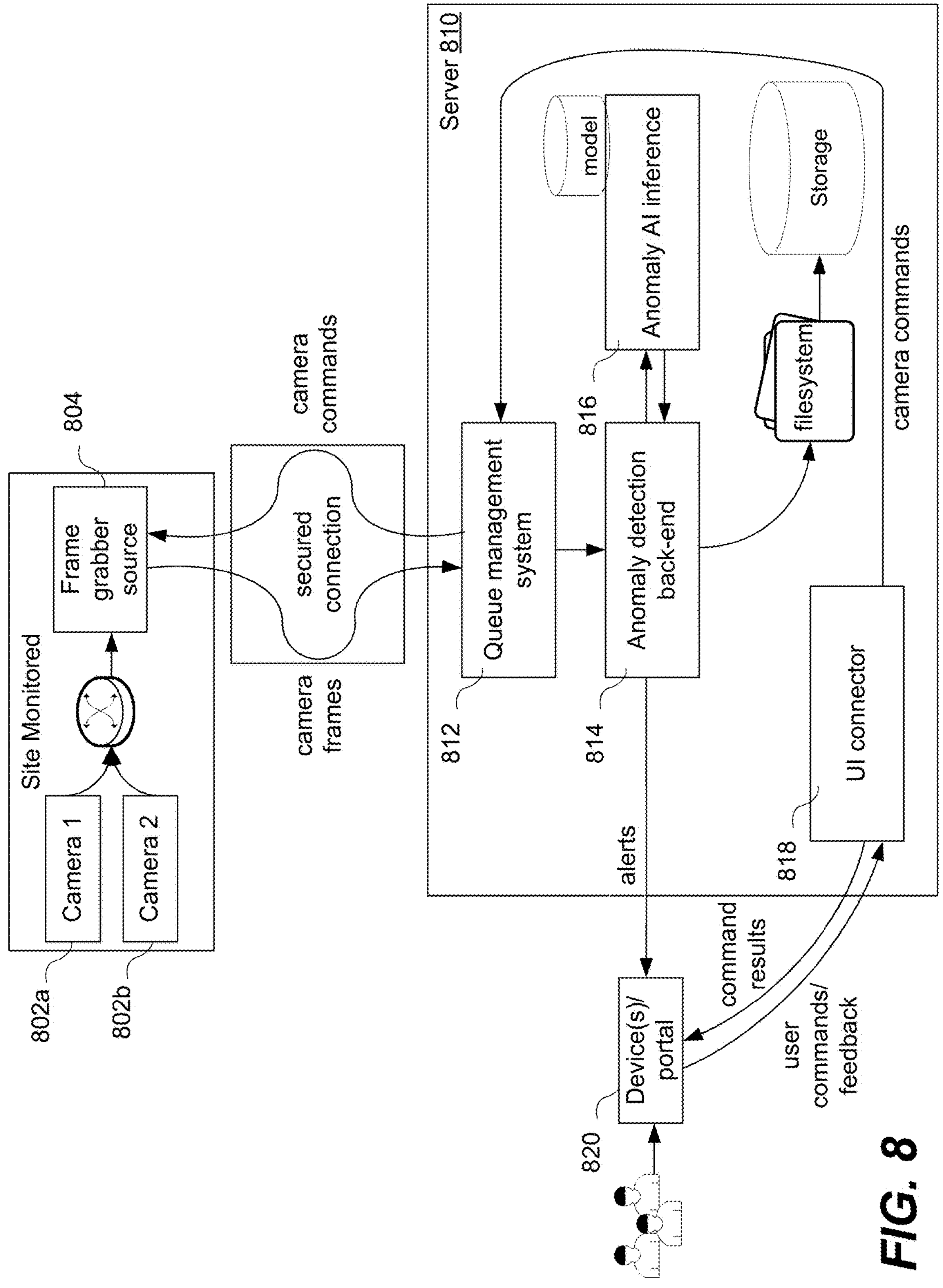
FIG. 8 shows an example architecture diagram for performing anomaly detection.

FIG. 8 shows an example architecture diagram for performing anomaly detection. One or more cameras 802*a*, 802*b* are installed at a site to capture images of a physical asset. The images from the cameras 802*a*, 802*b* are provided to frame grabber 804, which is in communication with a server 810 that performs anomaly detection on the images.

The server 810 may comprise a messaging software or queue management system 812, such as RabbitMQ™, that is used to communicate with the frame grabber 804 and acquire images corresponding to the camera frames. The images are provided to anomaly detection functionality 814, which runs anomaly detection model 816 to classify the image data and identify anomalies in the images. When the probability of the physical anomaly being present in the image exceeds a threshold value, an alert is output to one or more operator devices and/or to a portal 820. Event data, such as the anomalous image, a predicted type of anomaly, etc., may also be stored in a file system and packaged in a messaging program such as Slack™ or to a UI connector 818 and output to the operator devices and/or portal 820. A snooze functionality may be provided in the anomaly detection functionality 814, which recognizes that once an alert is sent, it may be unnecessary to continue sending alerts for the same anomaly. The snooze functionality may snooze alerts for X minutes before alerting to an anomaly at the same asset.

The operator devices 820 can also send commands to the messaging program 818 to obtain images, and the messaging program can send commands to the messaging software 812 to request images from frame grabber 804.

It would be appreciated by one of ordinary skill in the art that the system and components shown in the figures may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

It is contemplated that any part of any aspect or embodiment discussed in this specification can be implemented or combined with any part of any other aspect or embodiment discussed in this specification.

It should be recognized that features and aspects of the various examples provided above can be combined into further examples that also fall within the scope of the present disclosure.

When used in this specification and claims, the terms "comprises" and "comprising" and variations thereof mean that the specified features, steps or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

The invention claimed is:

1. An anomaly detection method, comprising:

receiving image data from one or more cameras configured to capture an image of a physical asset;

determining a probability of a physical anomaly being present in the image data using an artificial intelligence model that is trained to detect anomalous image data, wherein the artificial intelligence model is trained using image data representing normal operating conditions of the physical asset; and outputting an alert when the probability of the physical anomaly being present in the image data exceeds a threshold value, the method further comprising:

analyzing the image data to determine that the physical anomaly is a specific type of anomaly, comprising determining a probability that the physical anomaly is the specific type of anomaly using one or more secondary artificial intelligence models that are trained to predict the physical anomaly as being one or more types of anomalies; and outputting the alert including information on the specific type of anomaly present in the image data.

2. The anomaly detection method of claim 1, wherein the one or more secondary artificial intelligence models comprise a model that is trained to perform image segmentation on the image data to classify the anomaly as being the specific type of anomaly.

3. The anomaly detection method of claim 1, wherein the one or more secondary artificial intelligence models comprise a multi-modal generative AI model.

4. The anomaly detection method of claim 3, further comprising receiving a context of the image data, wherein the multi-modal generative AI model uses the context of the image data to determine the probability that the physical anomaly is the specific type of anomaly.

5. The anomaly detection method of claim 3, further comprising receiving audio data and/or vibration data associated with the physical asset, wherein the multi-modal generative AI model uses the received audio and/or vibration data to determine the probability that the physical anomaly is the specific type of anomaly.

6. The anomaly detection method of claim 3, wherein the multi-modal generative AI model is configured to generate an output comprising one or both of: a description of the specific type of anomaly, and a suggested action for responding to the specific type of anomaly.

7. The anomaly detection method of claim 1, wherein determining that the physical anomaly is the specific type of anomaly comprises applying one or more rules to the image data.

8. The anomaly detection method of claim 1, further comprising receiving auxiliary data associated with the physical asset from one or more sensors, and wherein determining that the physical anomaly is the specific type of anomaly is further based on the auxiliary data.

9. The anomaly detection method of claim 1, wherein analyzing the image data to determine that the physical anomaly is the specific type of anomaly is performed automatically when the probability that the physical anomaly is present in the image data exceeds the threshold value.

10. The anomaly detection method of claim 1, wherein analyzing the image data to determine that the physical anomaly is a specific type of anomaly is performed in response to a prompt to identify the specific type of anomaly.

11. The anomaly detection method of claim 1, further comprising receiving user feedback on the specific type of anomaly, and updating the one or more secondary artificial intelligence models based on the user feedback.

12. The anomaly detection method of claim 1, further comprising, in response to outputting the alert, receiving user feedback that the image data is normal, and updating the artificial intelligence model based on the user feedback.

13. An anomaly detection system, comprising:

a processor; and a non-transitory computer-readable memory having stored thereon computer-executable instructions which, when executed by the processor, configure the anomaly detection system to perform an anomaly detection method, comprising:

receiving image data from one or more cameras configured to capture an image of a physical asset;

determining a probability of a physical anomaly being present in the image data using an artificial intelligence model that is trained to detect anomalous image data, wherein the artificial intelligence model is trained using image data representing normal operating conditions of the physical asset; and outputting an alert when the probability of the physical anomaly being present in the image data exceeds a threshold value, analyzing the image data to determine that the physical anomaly is a specific type of anomaly, comprising determining a probability that the physical anomaly is the specific type of anomaly using one or more secondary artificial intelligence models that are trained to predict the physical anomaly as being one or more types of anomalies; and outputting the alert including information on the specific type of anomaly present in the image data.

14. A method of training an anomaly detection model, comprising:

obtaining training images comprising normal image data representing normal operating conditions of a physical asset;

training an artificial intelligence model using the training images to determine a probability of a physical anomaly being present in the image data;

obtaining further training images comprising anomalous image data that have a known anomaly; and training one or more secondary artificial intelligence models to determine the known anomaly present in the anomalous image data.

15. The method of claim 14, wherein the one or more second artificial intelligence models comprise a multi-modal generative AI model, and the method further comprises:

obtaining additional training data comprising an additional input type; and training the multi-modal generative AI model to determine the known anomaly present in the anomalous image data based on the training images comprising anomalous image data and the additional training data.

16. The method of claim 15, further comprising training the multi-modal generative AI model to generate outputs associated with the known anomaly in response to different input prompts.

17. An anomaly detection model trained in accordance with the method of claim 14.

* * * * *